No. 857,438. PATENTED JUNE 18, 1907.
W. BRYSON.
SAW TOOL.
APPLICATION FILED JAN. 16, 1905.
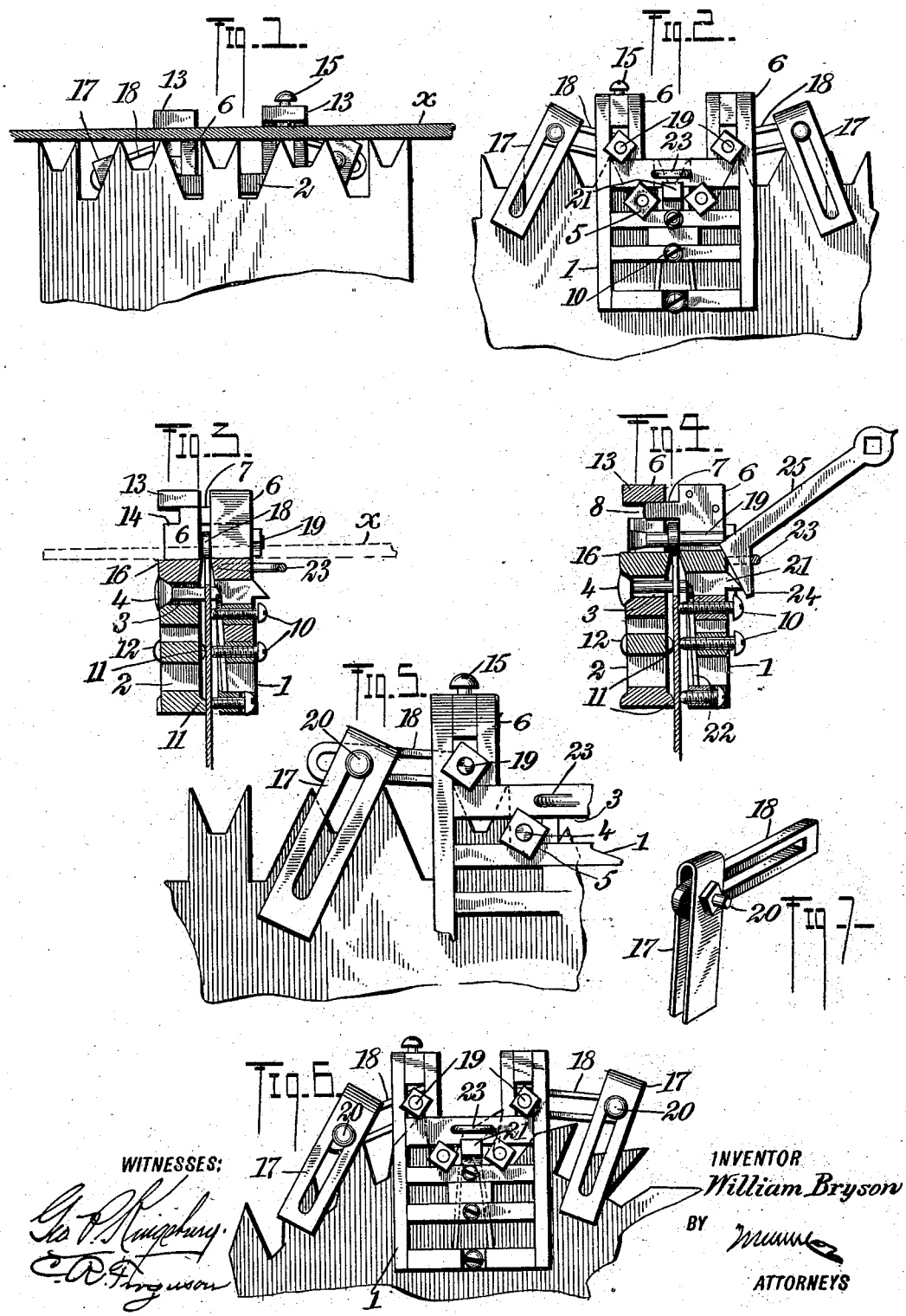
WITNESSES:
INVENTOR
William Bryson
BY
ATTORNEYS

UNITED STATES PATENT OFFICE.

WILLIAM BRYSON, OF FIFIELD, WISCONSIN.

SAW-TOOL.

No. 857,438.  Specification of Letters Patent.  Patented June 18, 1907.

Application filed January 16, 1905. Serial No. 241,263.

*To all whom it may concern:*

Be it known that I, WILLIAM BRYSON, a citizen of the United States, and a resident of Fifield, in the county of Price and State of Wisconsin, have invented a new and Improved Saw-Tool, of which the following is a full, clear, and exact description.

This invention relates to improvements in tools employed in filing, jointing, side filing and setting saw teeth, an object being to provide a device for this purpose by the aid of which the several operations on a saw may be quickly performed.

I will describe a saw tool embodying my invention, and then point out the novel features in the appended claim.

Reference is to be had to the accompanying drawings forming a part of this specification, in which similar characters of reference indicate corresponding parts in all the figures.

Figure 1 is an elevation of a saw tool embodying my invention and showing the arrangement of the device for jointing the cutting teeth of a saw; Fig. 2 shows the device as arranged for filing the clearing teeth; Fig. 3 is a sectional view illustrating the tool as employed for jointing the clearing teeth; Fig. 4 illustrates the manner of setting the cutting teeth; Fig. 5 indicates the position of parts while filing the cutting teeth; Fig. 6 shows the tool in connection with a circular saw for filing; and Fig. 7 is a perspective view of one of the saw tooth gages.

The device comprises two blocks 1, 2 designed to engage on opposite sides of the saw, both blocks being employed together. The blocks have parallel longitudinally disposed slots 3 through which fastening bolts 4 are designed to pass, these bolts being headed at one end, said heads on their inner sides being beveled to engage against the corresponding bevel of the slot openings, and at the other end are clamping nuts 5. Of course, when the tool is in position on a saw, the bolts will pass between the teeth as clearly indicated in Fig. 2. Each block at its ends has upwardly extended projections 6, and these projections are spaced apart so that a file may pass between them and operate transversely of the saw to joint the clearing teeth, as indicated in Fig. 3. The upward projection of one block, here shown as the block 1, has at the inner side tongues 7, designed to engage in slots 8, formed in the upward projections 6 of the other block, thus forming guides.

Arranged in the block 1 are screws 10 designed to clamp the tool against the saw blade. The other block has projections 11 for engaging against the opposite side of the saw blade, and this block 2 also has on its other side projections 12 for engaging against the saw blade when the said block is used in the jointing operation. The upward projections 6 of the block 2 have at the upper end outwardly extended flanges 13, below which are shoulders 14, and between these flanges and the shoulders, a file $x$ is designed to be placed flatwise for the purpose of jointing the cutting teeth, and the file is held in connection with the block by means of a clamping screw 15 engaging in a tapped hole in one of the flanges 13. When the tool is employed for jointing the cutting teeth, the block 1 is omitted, and it is also omitted when filing the sides of the saw teeth. During this operation the upper edge of the file is engaged with the flanges 13 and the lower edge with shoulders 16 formed below the shoulders 14.

The gages used while filing the saw teeth consist of strips of metal 17 folded to engage against opposite sides of the saw blade and these gages are adjustably connected to links 18 secured between the blocks 1 and 2 by means of bolts 19 which pass through the upward projections 6 and through said links. The members of the gages are longitudinally slotted, and through these slots and through the links, clamping bolts 20 are passed. By this arrangement the gages may be adjusted as to angle and projection relatively to the links. After setting the gages the tool is to be moved along the saw, while filing the teeth and thus obviously, all of the teeth will be filed at the same end. In filing the teeth of a circular saw, only one gage will be set, as indicated in Fig. 6.

The tooth setting device consists of a tappet 21 mounted to slide in an opening in the block 1, and it is held yieldingly outward or moved outward when relieved from pressure by means of a spring 22 which engages against the inner end of said tappet, the said spring being attached at its end to the inner side of the block 1. On the outer side of the block 1 is a fulcrum loop 23 through which the downwardly extended portion 24 of an actuating lever 25 is designed to pass to engage with the outwardly extended end of the tappet 21. When the blocks are in position on a saw, a downward pressure on the lever 25 will cause the tappet 21 to move inward and bend or set the tooth.

Having thus described my invention, I claim as new and desire to secure by Letters Patent,—

A saw tool comprising blocks adapted to engage opposite sides of a saw, the blocks having longitudinal slots and each provided at its ends with upwardly extending projections, clamping bolts passing through the slots of the blocks, a slotted link pivoted between opposing projections of the blocks, a U-shaped and slotted gage, and a bolt passing through the slots of the link and gage.

In testimony whereof I have signed my name to this specification in the presence of two subscribing witnesses.

WM. BRYSON.

Witnesses:
    ABE WILEY,
    C. E. HALL.